US012754621B2

(12) United States Patent
Leung et al.

(10) Patent No.: US 12,754,621 B2
(45) Date of Patent: Oct. 6, 2026

(54) STYLUS ANTENNA

(71) Applicant: Apple Inc., Cupertino, CA (US)

(72) Inventors: Brandon Y Leung, San Jose, CA (US); Zhe Zhang, Santa Clara, CA (US); Caleb J Flori, Cupertino, CA (US); Lu Zhang, Shanghai (CN); Stephen J Marrone, San Francisco, CA (US); Harish Rajagopalan, San Jose, CA (US); Colin J Abraham, Mountain View, CA (US); Kevin Bui, San Jose, CA (US); Stephanie Chou, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/487,471

(22) Filed: Oct. 16, 2023

(65) Prior Publication Data

US 2025/0123697 A1 Apr. 17, 2025

(51) Int. Cl.
*G06F 3/0354* (2013.01)
*H01Q 1/22* (2006.01)

(52) U.S. Cl.
CPC ........... *G06F 3/03545* (2013.01); *H01Q 1/22* (2013.01)

(58) Field of Classification Search
CPC .............................. G06F 3/03545; H01Q 1/22
See application file for complete search history.

(56) References Cited

U.S. PATENT DOCUMENTS

| | | | | |
|---|---|---|---|---|
| 5,576,502 | A * | 11/1996 | Fukushima | G06F 3/03545 73/862.68 |
| 6,262,684 | B1 | 7/2001 | Stewart et al. | |
| 9,965,052 | B2 | 5/2018 | Coutts et al. | |
| 10,496,192 | B2 | 12/2019 | Zhang et al. | |
| 10,627,922 | B2 | 4/2020 | Zhang et al. | |
| 10,817,078 | B2 | 10/2020 | Yoo et al. | |
| 11,023,056 | B2 | 6/2021 | Lai | |
| 2017/0010697 | A1* | 1/2017 | Jiang | G06F 3/03545 |
| 2017/0068342 | A1* | 3/2017 | Zimmerman | G06F 3/0414 |
| 2018/0217687 | A1* | 8/2018 | Yoo | G06F 3/03545 |
| 2018/0309190 | A1 | 10/2018 | Niakan | |
| 2020/0097102 | A1* | 3/2020 | Zhang | H01Q 1/2258 |

(Continued)

FOREIGN PATENT DOCUMENTS

CN 108595034 A 9/2018

*Primary Examiner* — Patrick N Edouard
*Assistant Examiner* — Eboni N Giles
(74) *Attorney, Agent, or Firm* — Treyz Law Group, P.C.; Michael H. Lyons; Kendall P. Woodruff

(57) ABSTRACT

A computer stylus may have a shaft with a metal tube and a cap slidable between open and closed positions. A connector port may be exposed in the open position and hidden in the closed position. An antenna element may be formed from conductive traces on a printed circuit board in the shaft and aligned with a window in the metal tube. The cap may include a metal hook extending from a conductive wall into the shaft. The hook may overlap the antenna element in the closed position. The shaft may include a dielectric bumper in an opening of the hook. The hook and wall may slide relative to the shaft along the dielectric bumper. The cap may include a metal sleeve around the port. The cap may include a conductive bumper on the wall. The conductive bumper may contact the sleeve when the cap is in the closed position.

20 Claims, 13 Drawing Sheets

(56) References Cited

U.S. PATENT DOCUMENTS

| | | | | |
|---|---|---|---|---|
| 2021/0373679 | A1* | 12/2021 | Shin | G06F 3/0393 |
| 2021/0405776 | A1* | 12/2021 | Justin | H02J 7/0042 |
| 2023/0045649 | A1 | 2/2023 | Chen et al. | |

* cited by examiner

STYLUS ANTENNA

FIELD

This relates generally to electronic devices, including electronic devices with wireless communications capabilities.

BACKGROUND

Electronic devices such as tablet computers and other portable devices are often provided with wireless circuitry and displays. The displays can include touch sensitive displays that receive an input from a computer stylus. The computer stylus can also be provided with wireless circuitry.

It can be challenging to form wireless circuitry in compact devices such as a computer stylus. If care is not taken, the presence of conductive structures in the computer stylus can adversely affect antenna performance. It would therefore be desirable to be able to provide improved wireless circuitry for compact devices such as computer styluses.

SUMMARY

A computer stylus may be provided that supplies input to an electronic device such as a tablet computer. The stylus may have an elongated body with a tip and an opposing cap coupled together by a shaft. The shaft may include a metal tube and an outer tube that covers the metal tube. The cap may be slidable relative to the shaft between an open position and a closed position. The cap may include a connector port that is exposed in the open position and that is hidden in the closed position.

The stylus may include a printed circuit board in the shaft. The stylus may include an antenna having an antenna resonating element formed from conductive traces on the printed circuit board. The antenna resonating element may be aligned with a window in the metal tube. The printed circuit board may be attached to the metal tube by conductive screws on opposing sides of the window. A plastic block may be disposed over the antenna resonating element.

The cap may include a metal hook that extends from a conductive wall into the shaft. The metal hook may overlap the antenna resonating element in the closed position. The shaft may include a dielectric bumper inserted into an opening in the metal hook. The metal hook and the conductive wall may slide relative to the shaft along the dielectric bumper. The dielectric bumper may prevent the cap from sliding off the stylus. The cap may include a metal sleeve around the connector port. The cap may include a compressive conductive bumper on the conductive wall. The compressive conductive bumper may contact the metal sleeve when the cap is in the closed position. This may serve to couple the metal hook to the ground of the antenna in the closed position, preventing the metal hook from deteriorating antenna performance.

DETAILED DESCRIPTION

Figure 1:
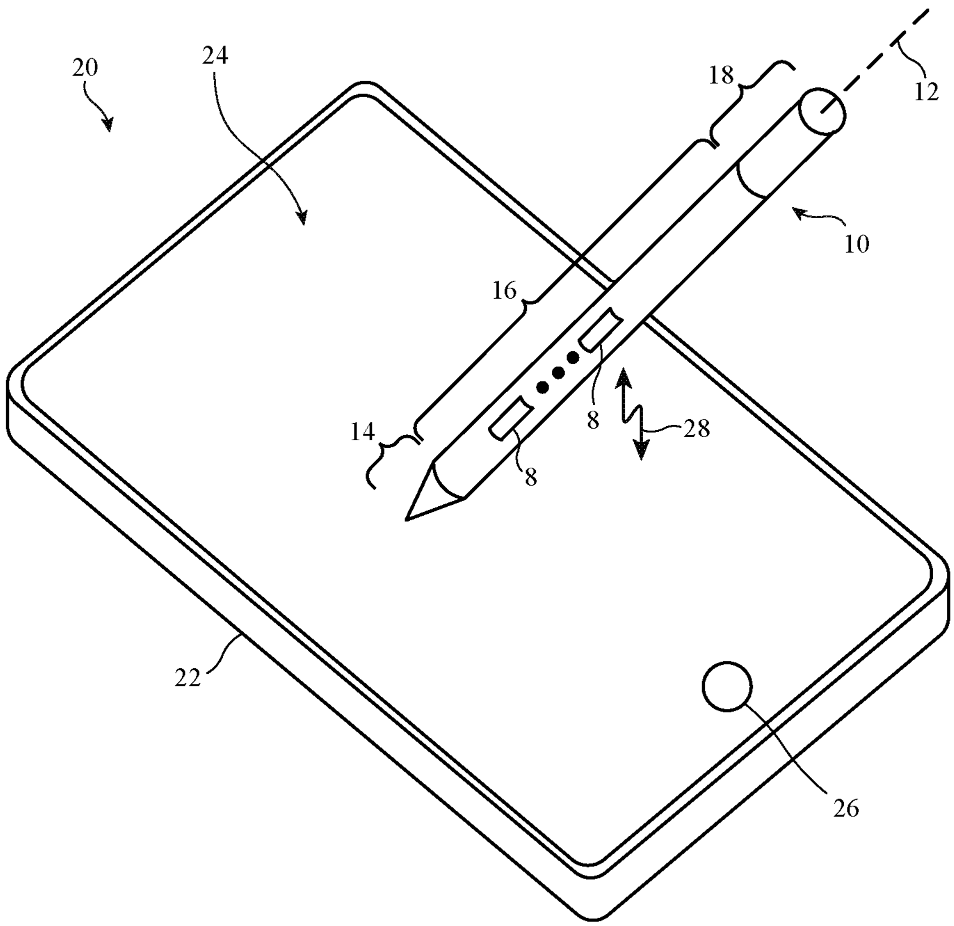
FIG. 1 is a perspective view of an illustrative tablet computer and an associated computer stylus in accordance with some embodiments.

A system that includes electronic equipment that communicates wirelessly is shown in FIG. 1. The equipment of FIG. 1 includes electronic device 10 and electronic device 20. Electronic equipment such as devices 10 and 20 may, in general, be computing devices such as laptop computers, computer monitors containing embedded computers, tablet computers, cellular telephones, media players, or other handheld or portable electronic devices, smaller devices such as wrist-watch devices, pendant devices, headphone or earpiece devices, devices embedded in eyeglasses or other equipment worn on a user's head (e.g., virtual, mixed, and/or augmented reality glasses or goggles), or other wearable or miniature devices, televisions, computer displays that do not contain embedded computers, gaming devices, navigation devices, embedded systems such as a systems in which electronic equipment is mounted in kiosks or automobiles, computer accessories such as touch pads, computer mice, computer styluses, or other electronic accessories, equipment that implements the functionality of two or more of these devices, or other electronic equipment.

In the illustrative configuration of FIG. 1, which is sometimes described herein as an example, device 20 is a tablet computer or another type of device having a touch screen and device 10 is a computer stylus. Device 10 is therefore sometimes referred to herein as stylus 10 whereas device 20 is sometimes referred to herein as tablet computer 20. When a drawing program or other software is running on tablet computer 20, a user can use stylus 10 to draw on tablet computer 20 and to provide other input to tablet computer 20.

Tablet computer 20 may include a housing such as housing 22. Tablet computer 20 may have a display such as display 24 mounted to housing 22. Input-output devices such as button 26 may be used to supply input to tablet computer 20. Button 26 may be omitted if desired. Display 24 may be a touch-sensitive display (e.g., a capacitive touch screen display or a touch display that includes other types of touch sensor technology). If desired, display 24 may also be force-sensitive. Display 24 may be configured to receive input from stylus 10.

Stylus 10 may have a cylindrical shape or other elongated body that extends along longitudinal axis 12. The body of stylus 10 may be formed from metal and/or plastic tubes and other elongated structures. Stylus 10 and tablet computer 20 may contain wireless circuitry for supporting wireless communications via wireless communications link 28. As an example, stylus 10 may supply wireless input to tablet computer 20 via wireless communications link 28 (e.g., information on settings in a drawing program or other software running on tablet computer 20, input to select a desired on-screen option, input to supply tablet computer 20 with a touch gesture such as a stylus flick, input to draw a line or other object on display 24, input to move or otherwise manipulate images displayed on display 24, input associated with how a user is touching or holding stylus 10, orientation sensor data generated by an orientation sensor on stylus 10, force sensor data indicative of how hard stylus 10 is pressed against display 24, touch, force, capacitive, and/or orientation sensor data indicative of the angle at which stylus 10 is oriented with respect to display 24 while drawing on display 24, etc.).

Stylus 10 may have a tip such as tip 14. Tip 14 may contain a conductive elastomeric member that is detected by the capacitive touch sensor of display 24. If desired, tip 14 may contain active electronics (e.g., circuitry that transmits signals that are capacitively coupled into the touch sensor of display 24 and that are detected as touch input on the touch sensor).

Stylus 10 may have an elongated body such as shaft 16. Stylus 10 may also have a cap 18 at the end of stylus 10 opposite tip 14 (e.g., shaft 16 may couple tip 14 to cap 18). Cap 18 may contain active electronics (e.g., circuitry that transmits signals that are capacitively coupled into the touch sensor of display 24 and that are detected as touch input on the touch sensor), buttons, sensor components such as a touch sensor, proximity sensor, or force sensor, or other input-output components.

In implementations that are described herein as an example, cap 18 may include a connector port. The connector port may be configured to receive a power and/or data connector. The connector port may receive power from the connector (e.g., to charge a battery on stylus 10) and/or may convey data over the connector. The connector port may be a universal serial bus (USB) port such as a USB-C port, for example. Cap 18 may be a movable cap that is slidable between a closed position and an open position (e.g., without detaching from shaft 16). When cap 18 is in the closed position, the housing of cap 18 covers the connector port. This protects the connector port from moisture, damage, and other contaminants, while also providing stylus 10 with a smooth (continuous) and cosmetically appealing exterior surface from shaft 16 to cap 18. When cap 18 is in the open position, the housing of cap 18 is moved away from shaft 16 to expose the connector port. This allows the connector port to receive a corresponding wired connector. Cap 18 may include a conductive retention member such as a metal hook that prevents cap 18 from falling off stylus 10 in the open position.

Sensor components at cap 18 or elsewhere in stylus 10 may, for example, generate touch or proximity sensor data indicative of whether or not cap 18, tip 14, or other portions of stylus 10 are being pressed against display 24 of tablet computer 20, force sensor data indicative of how hard cap 18, tip 14, or other portions of stylus 10 are being pressed against display 24 of tablet computer 20, etc. Wireless circuitry in stylus 10 may convey this sensor data to tablet computer 20 over wireless communications link 28. Tablet computer 20 may change settings in a drawing program or may perform other software and/or hardware operations based on the sensor data received from stylus 10 (e.g., via execution of one or more software applications by an application processor on tablet computer 20). As one example, tablet computer 20 may use the received sensor data to activate an eraser function associated with a drawing program running on tablet computer 20 or may perform any other desired operations.

If desired, a force sensor may additionally or alternatively be incorporated into tip 14 of stylus 10. A force sensor in tip 14 may be used to measure how forcefully a user is pressing tip 14 of stylus 10 against the outer surface of display 24. Force data may then be wirelessly transmitted from stylus 10 to tablet computer 20 so that the thickness of a line that is being drawn on display 24 can be adjusted accordingly or so that tablet computer 20 may take other suitable action. In general, any desired information may be conveyed between stylus 10 and tablet computer 20 over wireless communications link 28.

If desired, stylus 10 may be provided with a clip (not shown) to help attach stylus 10 to a user's shirt pocket or other object, may be provided with a magnet to help attach stylus 10 to a magnetic attachment point in tablet computer 20 or other structure, or may be provided with other structures that help a user attach stylus 10 to external objects. Components such as components 8 may be formed on stylus 10 (e.g., on shaft 16 or elsewhere). Components 8 may include buttons, touch sensors, and other components for gathering input, light-emitting diodes or other components for producing output, etc. Components 8 may, for example, include input-output components, conductive structures that receive wireless power for charging the battery in stylus 10 and/or that receive other wireless signals (e.g., near-field signals), or any other desired components.

Figure 2:
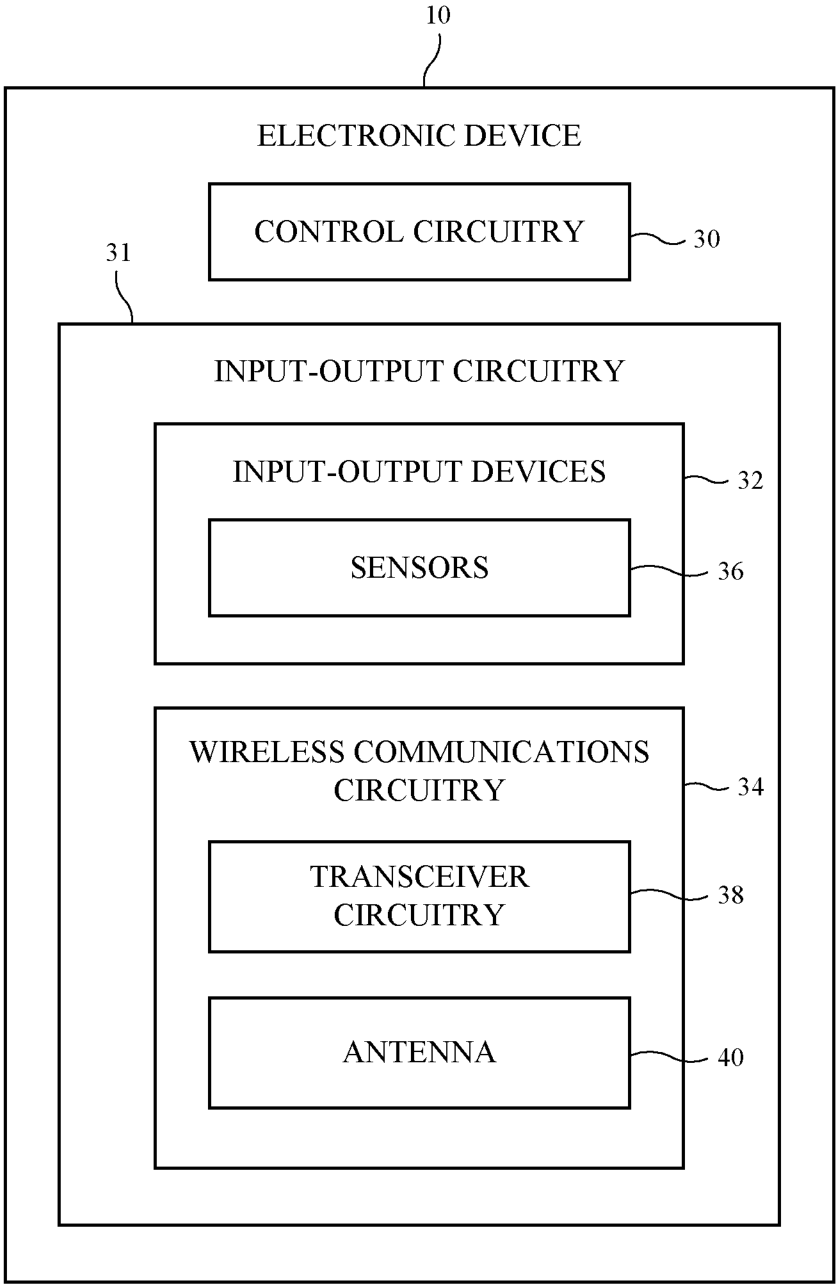
FIG. 2 is a schematic diagram of an illustrative stylus with wireless communications circuitry in accordance with some embodiments.

A schematic diagram showing illustrative components that may be used in stylus 10 is shown in FIG. 2. As shown in FIG. 2, stylus 10 may include control circuitry 30. Control circuitry 30 may include storage circuitry such as nonvolatile memory (e.g., flash memory or other electrically-programmable-read-only memory configured to form a solid-state drive), volatile memory (e.g., static or dynamic random-access-memory), etc. Control circuitry 30 may include processing circuitry used to control the operation of stylus 10. This processing circuitry may include one or more processors such as microprocessors, microcontrollers, digital signal processors, baseband processors, application specific integrated circuits, central processing units (CPUs), application processors, wireless power management circuitry, etc.

The processing circuitry in control circuitry 30 may be used to run software on stylus 10. The software may process input from buttons, sensors, and other input components. The software may also be used to provide output to a user (e.g., using light-emitting-diodes or other output components such as components 8 of FIG. 1). To support interactions with external equipment such as tablet computer 20, control circuitry 30 may be used in implementing one or more wireless communications protocols. Wireless communications protocols that may be implemented in stylus 10 include protocols for short-range wireless communications links such as the Bluetooth® protocol, NFC protocol, or other wireless personal area network (WPAN) protocols. If desired, other types of wireless communications protocols may be supported (e.g., wireless local area network (WLAN) protocols, satellite navigation links, cellular telephone protocols, ultra-wideband (UWB) protocols, IEEE 802.11ad protocols, MIMO protocols, antenna diversity protocols, antenna-based spatial ranging protocols, etc.). The use of Bluetooth communications is merely illustrative.

Stylus 10 may include input-output circuitry 31. Input-output circuitry 31 may include input-output devices 32. Input-output devices 32 may be used to allow data to be supplied to stylus 10 and to allow data to be provided from stylus 10 to external devices such as tablet computer 20 (FIG. 1). Input-output devices 32 may include user interface devices, data port devices, and other input-output components. For example, input-output devices 32 may include touch screens, displays without touch sensor capabilities, buttons, joysticks, scrolling wheels, touch pads, microphones, cameras, speakers, status indicators, light sources, audio jacks and other audio port components, digital data port devices (e.g., a wired connector port), light sensors, orientation sensors, accelerometers or other components that can detect motion and stylus orientation relative to the Earth and/or tablet computer 20, and/or other input-output components.

If desired, input-output devices 32 may include one or more sensors 36 such as capacitance sensors, proximity sensors (e.g., a capacitive proximity sensor and/or an infrared proximity sensor), magnetic sensors, and/or force sensors. Sensors 36 may be mounted at tip 14, cap 18, and/or shaft 16 of stylus 10 (FIG. 1) and may gather corresponding sensor data. Sensors 36 may, for example, sense the presence of display 24 and/or how stylus 10 is being used to interact with display 24. Sensors 36 may also gather sensor data indicative to how a user is holding or interacting with stylus 10 (e.g., touch sensor or proximity sensor data indicative of whether or not a user is touching cap 18 of stylus 10, force sensor data indicative of how hard a user is pressing against cap 18 of stylus 10 with their hand, etc.). This sensor data may be conveyed to tablet computer 20 over wireless communications link 28 (FIG. 1) for further processing by tablet computer 20.

As shown in FIG. 2, input-output circuitry 31 may include wireless communications circuitry 34 for communicating wirelessly with external equipment (e.g., tablet computer 20). Wireless communications circuitry 34 may include radio-frequency transceiver circuitry 38 and one or more antennas such as antenna 40. Transceiver circuitry 38 may include one or more transceivers, one or more transmitters, one or more receivers, mixer circuitry, one or more integrated circuits, power amplifier circuitry, low-noise input amplifier circuitry, passive radio-frequency components, matching circuitry, filter circuitry, clocking circuitry, radio-frequency transmission lines, and/or any other circuitry for transmitting and/or receiving radio-frequency signals over antenna 40.

Transceiver circuitry 38 may transmit and/or receive radio-frequency signals (e.g., for wireless communications link 28 of FIG. 1) within one or more frequency bands at radio frequencies (sometimes referred to herein as communications bands or simply as "bands"). The frequency band(s) handled by transceiver circuitry 38 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), LA band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Implementations in which transceiver circuitry 38 conveys radio-frequency signals using a Bluetooth band are described herein as an example.

Antenna 40 may be formed using any suitable antenna structures. For example, antenna 40 may include a loop antenna, a patch antenna, an inverted-F antenna, a planar inverted-F antenna, a slot antenna, a monopole antenna, a dipole antenna, a dielectric resonator antenna, a waveguide antenna, a helical antenna, hybrids of these designs, and/or any other types of antennas. Transmission line paths may be used to couple antenna 40 to transceiver circuitry 38. Transmission line paths in stylus 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission line paths, if desired.

Figure 3:
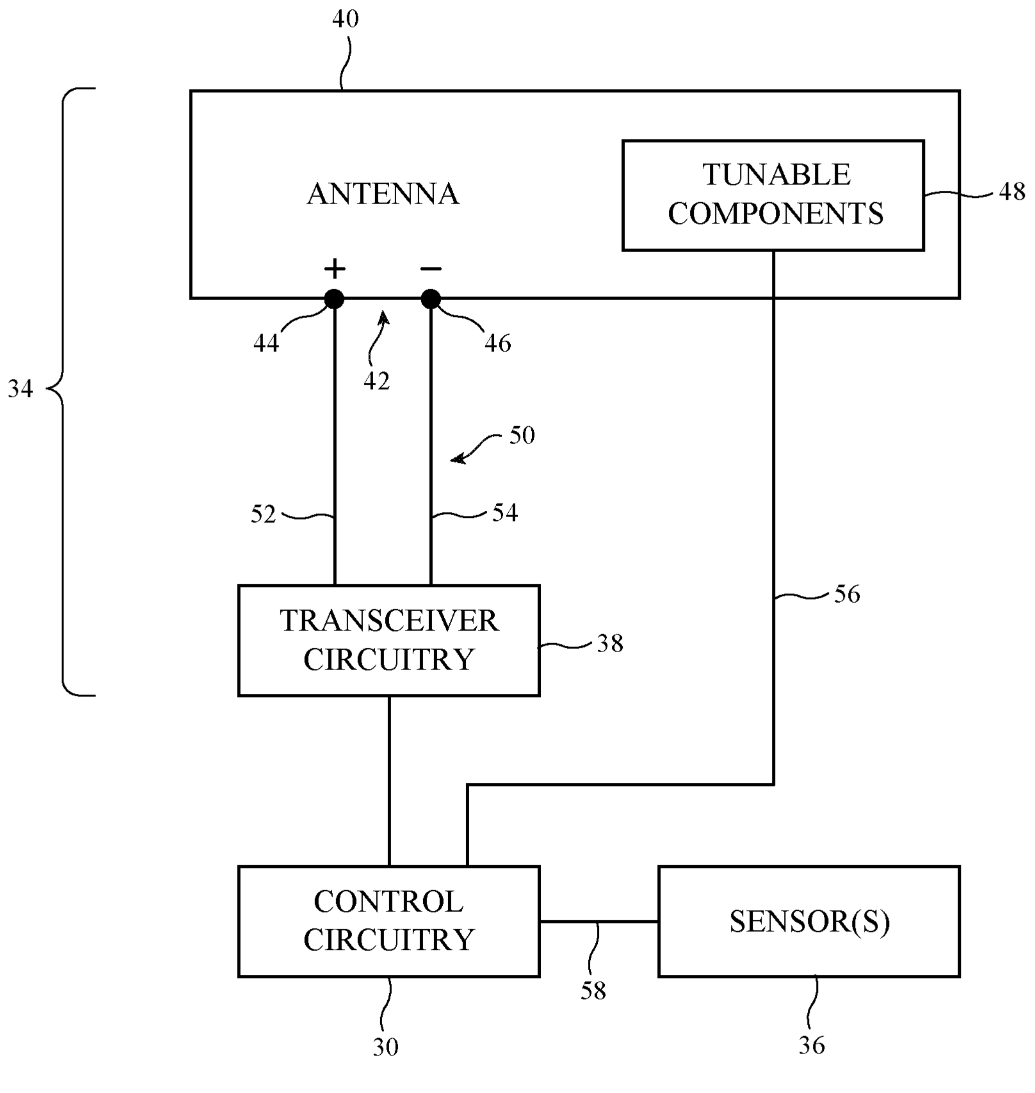
FIG. 3 is a diagram of illustrative wireless communications circuitry in a stylus in accordance with some embodiments.

As shown in FIG. 3, transceiver circuitry 38 in wireless communications circuitry 34 may be coupled to antenna 40 using a radio-frequency signal path such as transmission line path 50. Wireless communications circuitry 34 may be coupled to control circuitry 30 (e.g., over a baseband path). Control circuitry 30 may be coupled to sensors 36 over paths such as sensor data path 58.

Sensor data path 58 may include one or more conductive lines (e.g., conductive traces, wires, or other conductors) for coupling sensors 36 to control circuitry 30. For example, sensor data path 58 may include one or more sensor data conductors that convey sensor signals gathered by sensors 36 to control circuitry 30 and one or more ground conductors that are coupled to ground in stylus 10. Sensor signals conveyed over sensor data path 58 may include alternating current signals provided at frequencies that are much lower than the radio-frequencies handled by transceiver circuitry 38 (e.g., between 1 MHz and 5 MHz, below 1 MHz, or any other desired frequency below 600 MHz). Control circuitry 30 may also be coupled to other input-output devices 32 (FIG. 2) over respective data paths.

To provide antenna 40 with the ability to cover communications frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna).

If desired, antenna 40 may be provided with adjustable circuits such as tunable components 48 to tune antenna 40 over communications bands of interest. Tunable components 48 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of stylus 10, control circuitry 30 may issue control signals on one or more paths such as control path 56 that adjust inductance values, capacitance values, or other parameters associated with tunable components 48, thereby tuning antenna 40 to cover desired communications bands. Configurations in which antenna 40 is free of tunable components may also be used.

Transmission line path 50 may include one or more radio-frequency transmission lines. Transmission line path 50 may have a positive signal conductor such as signal conductor (line) 52 and a ground signal conductor such as ground conductor (line) 54. Conductors 52 and 54 may form parts of a coaxial cable or a microstrip transmission line (as examples). A matching network (not shown) formed from components such as inductors, resistors, and capacitors may be used in matching the impedance of antenna 40 to the impedance of transmission line path 50. Matching network components may be provided as discrete components (e.g., surface mount technology components) or may be formed from housing structures, printed circuit board structures, traces on plastic supports, etc. Components such as these may also be used in forming filter circuitry in antenna 40.

Transmission line path 50 may be coupled to antenna feed structures associated with antenna 40. As an example, antenna 40 may form an inverted-F antenna, a slot antenna, a hybrid inverted-F slot antenna or other antenna having an antenna feed 42 with a positive antenna feed terminal 44 and a ground antenna feed terminal 46. Signal conductor 52 may be coupled to positive antenna feed terminal 44 and ground conductor 54 may be coupled to ground antenna feed terminal 46. Other types of antenna feed arrangements may be used if desired. The illustrative feeding configuration of FIG. 3 is merely illustrative.

Control circuitry 30 may use the sensor signals gathered by sensors 36 and received over sensor data path 58 to perform any desired operations on stylus 10. For example, control circuitry 30 may control other input-output devices 32 (FIG. 2) based on the sensor signals. In another suitable arrangement, control circuitry 30 may adjust antenna 40 (e.g., using control signals provided to tunable components 48 over control path 56) based on the sensor signals. Control circuitry 30 may generate sensor data based on the sensor signals received over sensor data path 58. Control circuitry 30 may transmit the sensor data to transceiver circuitry 38. Transceiver circuitry 38 may generate radio-frequency signals that convey wireless data including or identifying the sensor data received from control circuitry 30. Transceiver circuitry 38 may use antenna 40 to transmit the radio-frequency sensor data to tablet computer 20 over wireless communications link 28 (FIG. 1).

Transmission line paths in stylus 10 such as transmission line path 50 may be integrated into rigid and/or flexible printed circuit boards. In one suitable arrangement, transmission line paths such as transmission line path 50 may also include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Figure 4:
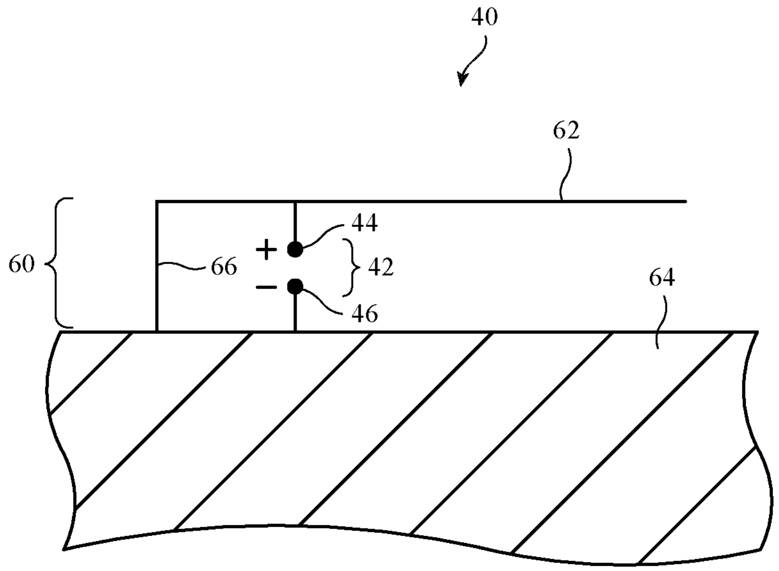
FIG. 4 is a diagram of an illustrative inverted-F antenna for a stylus in accordance with some embodiments.

In general, antenna 40 may be any type of antenna. In an implementation that is described herein as an example, antenna 40 is an inverted-F antenna. FIG. 4 is a diagram showing how antenna 40 may be implemented as an inverted-F antenna.

As shown in FIG. 4, antenna 40 may have an antenna resonating element 60 and an antenna ground 64 (sometimes referred to herein as ground structures 64, ground plane 64, or ground 64). When antenna 40 is implemented as an inverted-F antenna (as shown in FIG. 4), antenna resonating element 60 is an inverted-F antenna resonating element. This is merely illustrative. Antenna resonating element 60 may be a slot antenna resonating element when antenna 40 is implemented as a slot antenna, may be a monopole antenna resonating element when antenna 40 is implemented as a monopole antenna, etc. Antenna resonating element 60 may sometimes also be referred to herein as antenna radiating element 60 or antenna radiator 60.

In the example of FIG. 4, antenna resonating element 60 (e.g., an inverted-F antenna resonating element) has a resonating element arm such as arm 62 (sometimes also referred to herein as radiating arm 62). The length of arm 62 may be selected so that antenna 40 resonates at desired operating frequencies. For example, the length of arm 62 may be approximately one-quarter of the effective wavelength of operation of antenna 40. Arm 62 may exhibit a fundamental mode resonance and/or one or more harmonic resonances if desired (e.g., for covering additional frequencies). If desired, antenna resonating element 60 may include multiple arms 62 of different lengths for increasing the frequency coverage of antenna 40.

Arm 62 may be coupled (shorted) to antenna ground 64 by return path 66. Antenna feed 42 may include positive antenna feed terminal 44 and ground antenna feed terminal 46 and may run parallel to return path 66 between arm 62 and antenna ground 64. Positive antenna feed terminal 44 may be coupled to arm 62. Ground antenna feed terminal 46 may be coupled to antenna ground 64. If desired, antenna 40 may include parasitic antenna resonating elements (not shown), tunable components such as components 48 of FIG. 3, and/or other antenna structures for tuning the response of antenna 40. Arm 62 may follow a meandering path or may have other shapes (e.g., arm 62 may have any desired number of curved and/or straight segments extending in any desired directions and may have any desired number of curved and/or straight edges).

Figure 5:
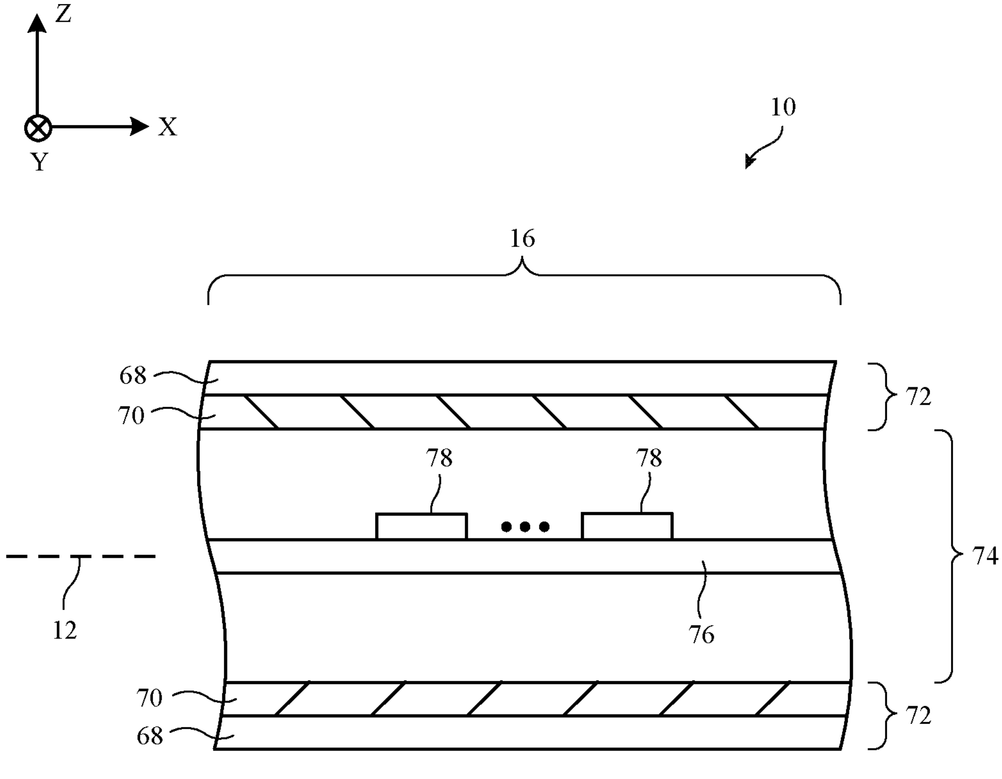
FIG. 5 is a cross-sectional side view of an illustrative stylus in accordance with some embodiments.

FIG. 5 is a cross-sectional side view of shaft 16 of stylus 10. As shown in FIG. 5, stylus 10 may have an elongated tube-shaped (cylindrical) housing such as housing 72. Housing 72 may wrap around longitudinal axis 12 and may enclose an interior cavity 74 of stylus 10. Housing 72 may be formed from metal, plastic, carbon-fiber composites and other fiber composites, glass, ceramic, other materials, and combinations of these materials.

Housing 72 may, for example, include a conductive inner housing portion such as metal tube 70 and a dielectric outer housing portion such as outer sleeve 68. Outer sleeve 68 may be layered onto the exterior surface of metal tube 70 (e.g., metal tube 70 and outer sleeve 68 may be concentric tubes about longitudinal axis 12 and interior cavity 74). Metal tube 70 may be formed from aluminum, stainless steel, titanium, copper, metal alloys, and/or other conductive materials. Outer sleeve 68 may be formed from plastic, polymer, ceramic, glass, carbon fiber, composites, and/or other dielectric materials. Outer sleeve 68 is sometimes also referred to herein as outer tube 68 or dielectric tube 68.

Metal tube 70 may help to provide mechanical strength to stylus 10 (e.g., preventing bending of stylus 10 during use). Metal tube 70 may also be used to form part of a system ground for stylus 10. Metal tube 70 may, for example, form part of the antenna ground 64 of an antenna 40 in stylus 10 (FIG. 4). Outer sleeve 68 may help to protect metal tube 70 and other components in stylus 10 from moisture, damage, and/or other contaminants. Outer sleeve 68 may also help to protect metal tube 70 from electrically shorting to other objects in the vicinity of stylus 10, such as the user's hand. Outer sleeve 68 may also provide stylus 10 with a desired cosmetic appearance and/or contribute to the ergonomic feel of stylus 10 when held by a user.

Stylus 10 may include a printed circuit board (PCB) 76 within interior cavity 74. Printed circuit board 76 has a lateral surface in the X-Y plane and extends along longitudinal axis 12 down shaft 16. Printed circuit board 76 may be a rigid printed circuit board or may be a flexible printed circuit. Printed circuit board 76 may, for example, be a main logic board of stylus 10.

Stylus 10 may include one or more electrical components 78 within interior cavity 74. Some or all of components 78 may be mounted to printed circuit board 76. Components 78 may include integrated circuits, sensors, battery structures, connectors, switches, and other circuitry (e.g., control circuitry 30 and/or input-output circuitry 31 of FIG. 2).

If desired, outer sleeve 68 and metal tube 70 need not be completely or perfectly cylindrical. For example, outer sleeve 68 and metal tube 70 may include overlapping planar portions (e.g., forming a planar wall of housing 72 extending along longitudinal axis 12). The planar wall of housing 72 may allow stylus 10 to rest on a surface without rolling and/or may allow stylus 10 to be mounted flush with a wireless power transmitting device (e.g., tablet computer 20 of FIG. 1) for receiving wireless power and/or for helping to prevent a user from losing stylus 10.

Figure 6:
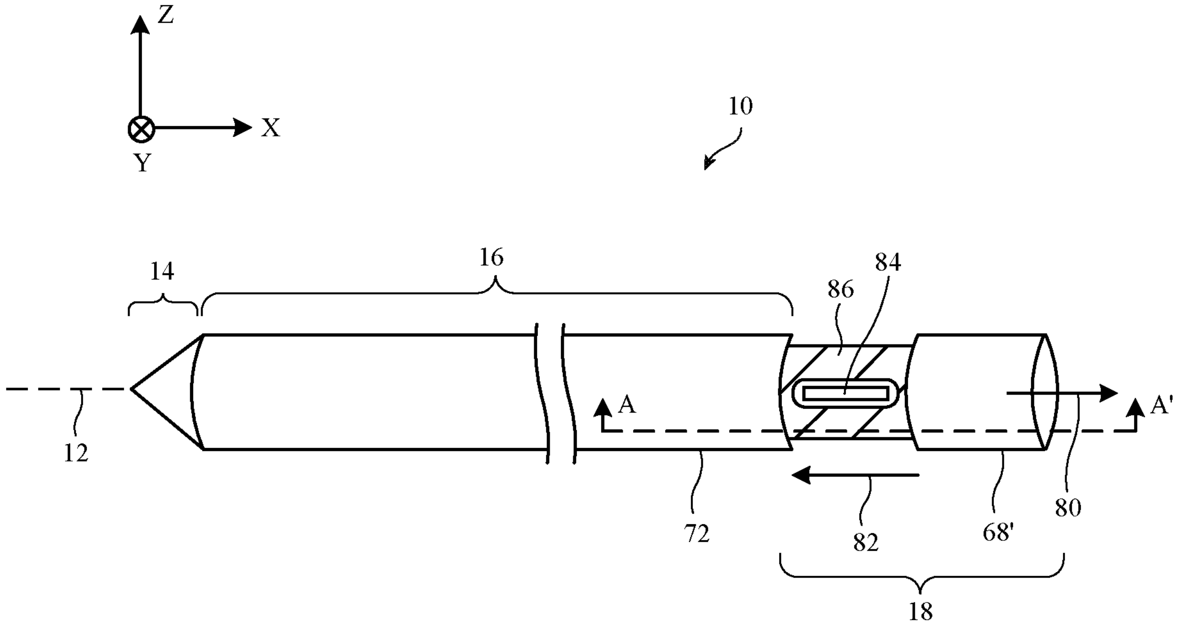
FIG. 6 is a side view showing how an illustrative stylus may have a movable cap that covers a connector port in accordance with some embodiments.

FIG. 6 is a side view of stylus 10. Shaft 16 may couple tip 14 to cap 18. As shown in FIG. 6, stylus 10 may include a connector port 84 in cap 18. Connector port 84 may be a wired data and/or power port. Connector port 84 may receive a mating wired connector. Connector port 84 may be a USB-C port, for example. Connector port 84 may extend radially away from longitudinal axis 12 (e.g., where the conductive contacts of connector port 84 are oriented orthogonal to longitudinal axis 12 or parallel to the Y-axis of FIG. 6). Connector port 84 may sometimes also be referred to as data connector 84, power connector 84, or simply as connector 84.

Cap 18 may have a conductive inner housing portion such as metal sleeve 86 and may have a dielectric housing portion such as dielectric cap housing 68'. Dielectric cap housing 68' may, for example, be formed from the same dielectric material as outer sleeve 68 of shaft 16 (FIG. 5) and may lie flush with outer sleeve 68 when cap 18 is in a closed position. Connector port 84 may be mounted to metal sleeve 86 and may protrude through or be aligned with an aperture in metal sleeve 86 for receiving a mating connector.

Cap 18 may be a movable cap that is slidable along longitudinal axis 12 with respect to shaft 16. For example, cap 18 may be movable (adjustable) between an open position or state and a closed position or state. In the closed position, dielectric cap housing 68' lies flush against the outer sleeve 68 (FIG. 5) of shaft 16 and cylindrically covers metal sleeve 86 and connector port 84. This protects connector port 84 from moisture, damage, or other contaminants, hides connector port 84 from view, and provides stylus 10 with a seamless and continuous outer housing that is cosmetically and ergonomically optimized.

From the closed position, dielectric cap housing 68' may be opened or pulled away from shaft 16 (as shown by arrow 80), placing cap 18 in the open position. In the open position, dielectric cap housing 68' is laterally separated from the housing 72 of shaft 16, exposing metal sleeve 86 and connector port 84. This allows a wired connector to be inserted into connector port 84 while cap 18 is in the open position. After the wired connector has been removed from connector port 84, dielectric cap housing 68' may be pushed back towards shaft 16 (as shown by arrow 82) to return cap 18 to the closed position.

Cap 18 may include a conductive retention member such as a metal hook (not shown in FIG. 6 for the sake of clarity). The conductive retention member may help to secure cap 18 in place on stylus 10 and may help to prevent cap 18 from falling off stylus 10 when in the open position. The conductive retention member may slide through metal sleeve 86 into and out of shaft 16 when cap 18 moves between the open and closed positions. Stylus 10 may include a non-conductive arresting member for the conductive retention member such as a dielectric bumper (not shown in FIG. 6 for the sake of clarity). The non-conductive arresting member may stop the conductive retention member from sliding off of stylus 10 in the open position.

The presence of conductive material in shaft 16 (e.g., metal tube 70 of FIG. 5) and cap 18 (e.g., metal sleeve 86) and the movability of cap 18 can make it difficult to incorporate antenna 40 into stylus 10 while still allowing antenna 40 to exhibit satisfactory levels of performance. To help mitigate these issues, antenna 40 may be disposed within shaft 16 next to cap 18.

Figure 7:
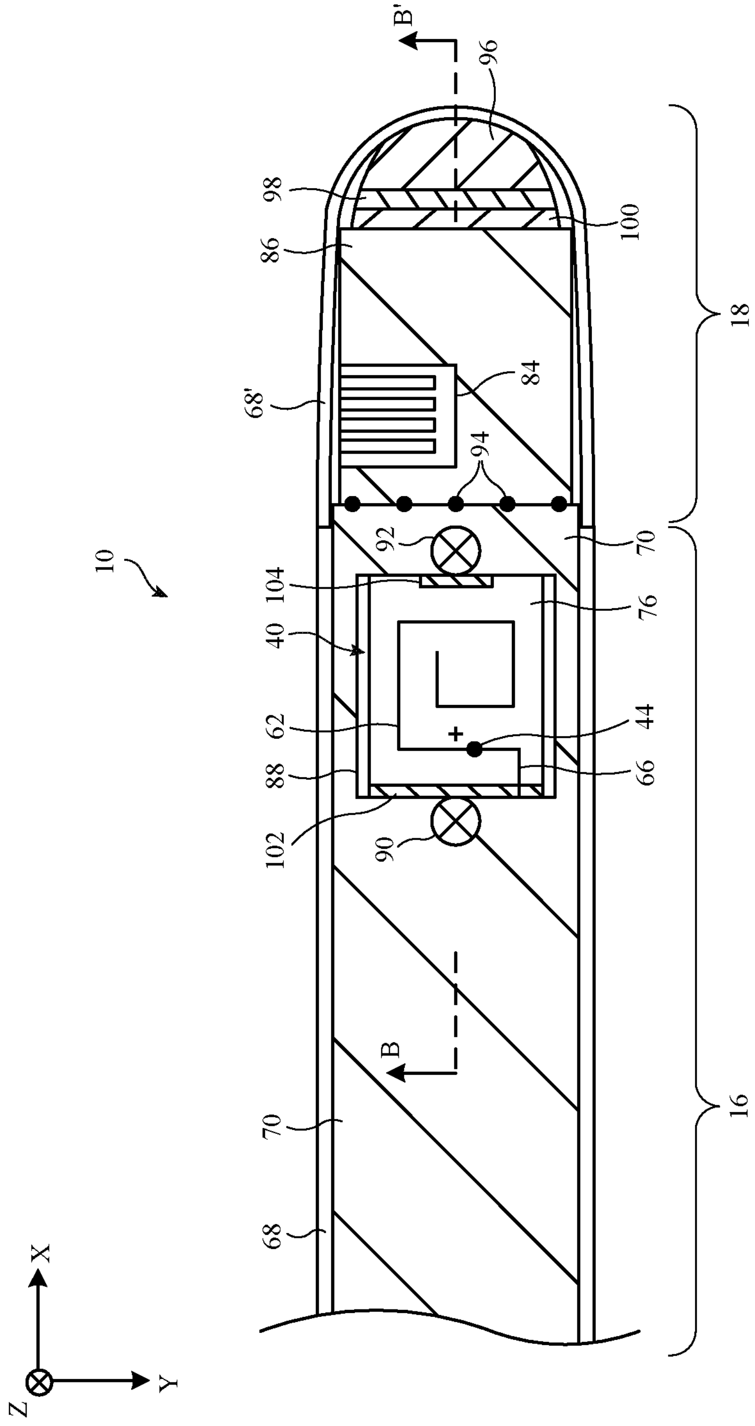
FIG. 7 is an interior top view of an illustrative stylus having an antenna next to a movable cap in a closed position in accordance with some embodiments.

FIG. 7 is an interior side view of stylus 10 showing how antenna 40 may be disposed within shaft 16 next to cap 18 (e.g., as taken in the direction of line AA' of FIG. 6, within outer sleeve 68 and dielectric cap housing 68' but external to metal tube 70 and metal sleeve 86). In the example of FIG. 7, cap 18 is in the closed position.

As shown in FIG. 7, dielectric cap housing 68' of cap 18 may lie flush with outer sleeve 68 of shaft 16 when cap 18 is in the closed position. The end of the metal tube 70 of shaft 16 may be coupled to the end of metal sleeve 86 of cap 18 by one or more welds 94 (e.g., laser welds). Welds 94 may mechanically attach and secure metal tube 70 to metal sleeve 86. Welds 94 may also electrically couple metal sleeve 86 to metal tube 70. This may serve to extend the ground of stylus 10 (e.g., the antenna ground of antenna 40) to also include metal sleeve 86.

Connector port 84 may be mounted to metal sleeve 86 within cap 18. Cap 18 may include a conductive wall 96 (e.g., at the distal end of stylus 10 opposite tip 14 of FIG. 1). The exterior surface of conductive wall 96 may be coupled or mounted to dielectric cap housing 68'. For example, a layer of pressure sensitive adhesive or other types of adhesives may adhere or attach conductive wall 96 to the inner surface of dielectric cap housing 68'.

Cap 18 may include a compressive conductive bumper 100 mounted to conductive wall 96. Cap 18 may include conductive adhesive 98 (e.g., conductive pressure sensitive adhesive) that mounts conductive bumper 100 to conductive wall 96. Conductive bumper 100 may be formed from conductive foam, a conductive gasket (e.g., an air loop gasket), a conductive spring (e.g., a canted coil spring), or other compressive conductive structures.

When cap 18 is in the closed position, conductive bumper 100 is pressed against metal sleeve 86. Conductive bumper 100 may exert a compressive force against metal sleeve 86. This may form a consistent and reliable electrical connection between conductive wall 96 and metal sleeve 86 through conductive adhesive 98 and conductive bumper 100. This may serve to further extend the ground of stylus 10 (e.g., the antenna ground of antenna 40) to also include conductive bumper 100, conductive adhesive 98, and conductive wall 96 (e.g., conductive wall 96 may be grounded to metal tube 70 through welds 94, metal sleeve 86, conductive bumper 100, and conductive adhesive 98 when cap 18 is in the closed position). Cap 18 may include a conductive retention member such as a metal hook coupled to conductive wall 96 and extending through the interior of metal sleeve 86 and metal tube 70, but that is hidden from view when cap 18 is in the closed position.

As shown in FIG. 7, metal tube 70 may include a dielectric antenna window such as antenna window 88. Antenna window 88 may be formed from a slot, notch, opening, gap, or aperture in metal tube 70. Antenna window 88 may expose printed circuit board 76 within the interior cavity of stylus 10. Antenna 40 may be mounted to printed circuit board 76 and may be aligned with or may overlap antenna window 88. For example, antenna 40 may include an antenna resonating element having an arm 62 formed from conductive traces patterned onto the portion of the lateral surface of printed circuit board 76 overlapping antenna window 88.

Arm 62 may follow a meandering, winding, or spiral path to help maximize the length of the arm (e.g., for covering a desired frequency band) while minimizing the overall footprint of the antenna. Positive antenna feed terminal 44 may be coupled to arm 62. Arm 62 may be shorted to ground traces 102 on printed circuit board 76 by return path 66 (e.g., a return path formed from a conductive trace on printed circuit board 76). Ground traces 102 may form part of the antenna ground for antenna 40 (e.g., antenna ground 64 of FIG. 4).

In this configuration, antenna 40 is an inverted-F antenna having an inverted-F antenna resonating element (e.g., arm 62 and return path 66) formed from conductive traces on printed circuit board 76. This is merely illustrative and, in general, antenna 40 may include other types of antenna resonating elements formed from conductive traces on printed circuit board 76 (e.g., a slot antenna resonating element formed from a slot in ground traces 102, a monopole antenna resonating element that is not shorted to ground traces 102 by a return path, a dipole antenna resonating element, a patch antenna resonating element, etc.).

Stylus 10 may include a first conductive interconnect structure such as a first conductive screw 90 that couples metal tube 70 to printed circuit board 76 at a first side of antenna 40 and antenna window 88. The example in which the first conductive interconnect structure is a conductive screw is merely illustrative. In general, first conductive screw 90 may be replaced with any desired conductive interconnect structure(s) such as one or more conductive screws, conductive springs, conductive pins, conductive clips, conductive brackets, conductive screw bosses, conductive wires, conductive prongs, conductive adhesive, solder, welds, and/or any other desired conductive interconnect structures.

First conductive screw 90 may help to mechanically secure printed circuit board 76 to metal tube 70 (e.g., at a first side of antenna 40). First conductive screw 90 may also electrically couple ground traces 102 to metal tube 70. This may serve to extend the antenna ground for antenna 40 from ground traces 102 to metal tube 70 at a location as close to arm 62 as possible, thereby optimizing the antenna efficiency, bandwidth, and/or radiation pattern of antenna 40.

Stylus 10 may also include a second conductive interconnect structure such as a second conductive screw 92 that couples metal tube 70 to printed circuit board 76 at a second side of antenna 40 and antenna window 88 (e.g., opposite first conductive screw 90). Antenna window 88 and the antenna resonating element of antenna 40 may be laterally interposed between first conductive screw 90 and second conductive screw 92. The example in which the second conductive interconnect structure is a conductive screw is merely illustrative. In general, second conductive screw 92 may be replaced with any desired conductive interconnect structure(s) such as one or more conductive screws, conductive springs, conductive pins, conductive clips, conductive brackets, conductive screw bosses, conductive wires, conductive prongs, conductive adhesive, solder, welds, and/or any other desired conductive interconnect structures.

Second conductive screw 92 may electrically couple metal tube 70 to a contact pad 104 on printed circuit board 76. Contact pad 104 may be electrically floating relative to the ground of printed circuit board 76 (contact pad 104 is not coupled to ground traces 102). This causes second conductive screw 92 to also be electrically floating relative to ground traces 102 at the side of antenna 40 opposite positive antenna feed terminal 44. Decoupling second conductive screw 92 from ground traces 102 in this way may serve to optimize the tuning of antenna 40. At the same time, second conductive screw 92 may help to mechanically secure printed circuit board 76 to metal tube 70 (e.g., at a second side of antenna 40).

Figure 8:
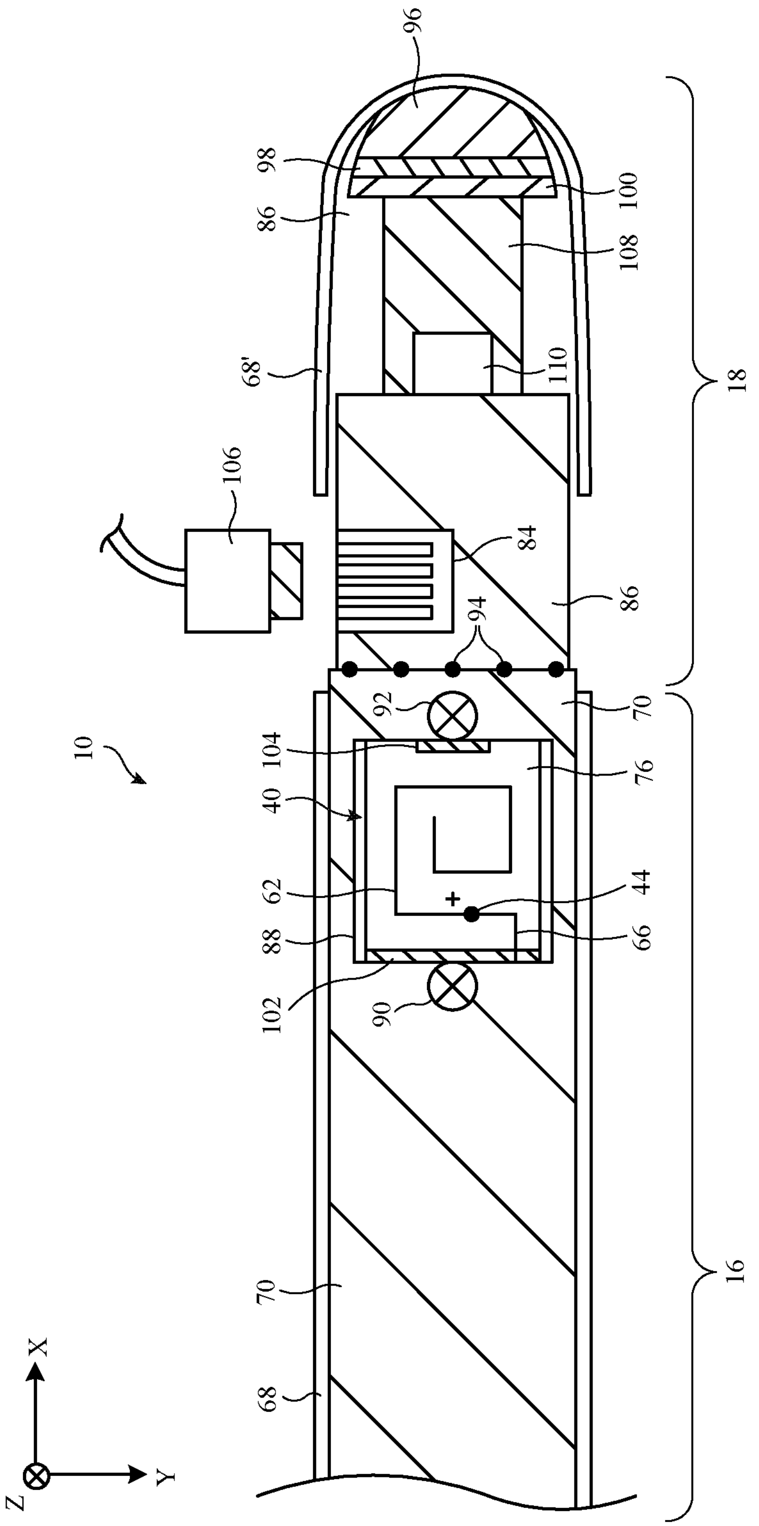
FIG. 8 is an interior top view of an illustrative stylus having an antenna next to a movable cap in an open position in accordance with some embodiments.

Cap 18 may be moved from the closed position to the open position, exposing connector port 84 as shown in the interior side view of FIG. 8. When cap 18 is in the open position, dielectric cap housing 68' is longitudinally separated from outer sleeve 68 of shaft 16, exposing metal sleeve 86 and connector port 84. A wired connector 106 may be inserted into connector port 84 to power/charge stylus 10 and/or to convey data.

As shown in FIG. 8, cap 18 may include a conductive retention member such as metal hook 108. Metal hook 108 may include an elongated loop or hook of conductive material that laterally surrounds an opening 110. The conductive material of metal hook 108 may completely surround the lateral periphery of opening 110 or may surround some but not all of opening 110 (e.g., opening 110 may be a closed slot or an open slot). Metal hook 108 may have any desired width parallel to the Y-axis. Metal hook 108 may be relatively narrow and extend within metal sleeve 86 (as shown in the example of FIG. 8) or may be relatively wide and extend around metal sleeve 86 (e.g., metal sleeve 86 may be inserted into opening 110).

Metal hook 108 may be coupled to conductive wall 96 (e.g., conductive bumper 100 and conductive adhesive 98 may surround metal hook 108 in the Y-Z plane). Metal hook 108 may be welded to conductive wall 96, may be adhered to conductive wall 96 using conductive adhesive or, if desired, metal hook 108 and conductive wall 96 may be formed from different integral portions of the same piece of conductive material. Metal hook 108 may sometimes also be referred to herein as conductive hook 108, metal (conductive) retention member 108, metal (conductive) retention loop 108, or metal (conductive) retention arm 108.

Metal hook 108 may extend through or around metal sleeve 86 and into metal tube 70. A non-conductive arresting member such as a dielectric bumper (not shown in FIG. 8 for the sake of clarity) on metal sleeve 86 and/or metal tube 70 may be inserted within opening 110. The dielectric bumper may stop hook 108 and thus conductive wall 96 and dielectric cap housing 68' from sliding or falling off shaft 16 when in the open position. Magnets (not shown) may be disposed on and/or within metal hook 108, metal sleeve 86, connector port 84, and/or shaft 16 to help propel cap 18 between the open and closed positions and/or to help hold cap 18 in the closed position when metal hook 108 has been fully inserted into metal tube 70.

Metal hook 108 is formed from conductive material to maximize the mechanical strength and integrity of cap 18 (e.g., to minimize the risk of cap 18 breaking off stylus 10). Metal hook 108 may overlap antenna 40 when cap 18 is in the closed position. If care is not taken, the presence of metal hook 108 in the vicinity of antenna 40 can undesirably limit or detune the wireless performance of antenna 40.

Figure 9:
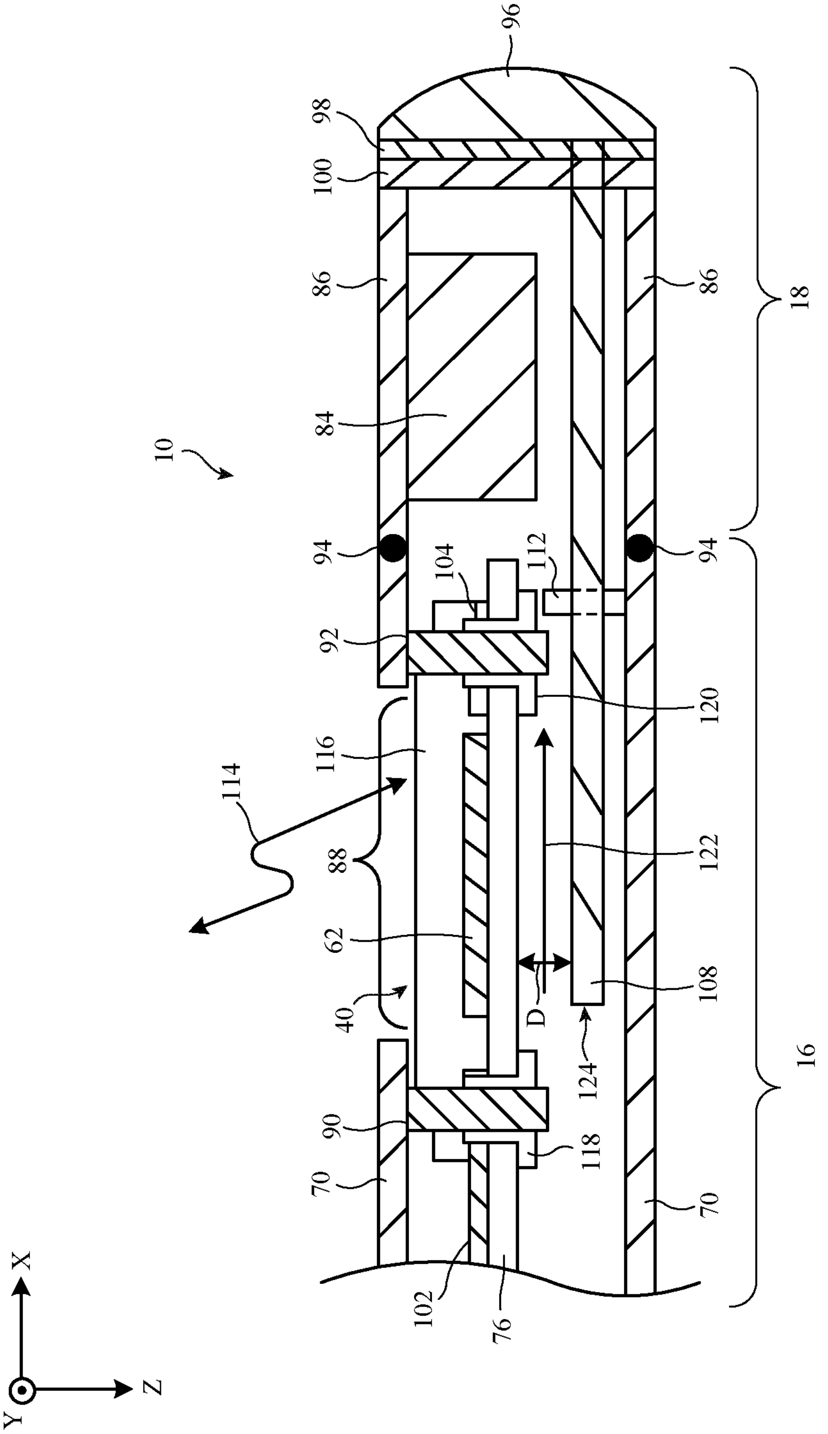
FIG. 9 is a cross-sectional side view of an illustrative stylus having an antenna next to a movable cap in a closed position in accordance with some embodiments.

FIG. 9 is a cross-sectional side view of stylus 10 showing how metal hook 108 may overlap antenna 40 when cap 18 is in the closed position (e.g., as taken in the direction of line BB' of FIG. 7). In the example of FIG. 9, outer sleeve 68 of shaft 16 and dielectric cap housing 68' (FIG. 7) have been omitted for the sake of clarity.

As shown in FIG. 9, when cap 18 is in the closed position, metal hook 108 extends through or around metal sleeve 86 and into metal tube 70. Metal hook 108 has a bent end or tip opposite conductive wall 96 such as end 124. End 124 extends into tube 70 of shaft 16 and may overlap antenna 40 or other portions of shaft 16 (e.g., end 124 and/or portions of metal hook 108 may be vertically interposed between arm 62 and the portion of metal tube 70 opposite window 88). Metal hook 108 is vertically separated from arm 62 of antenna 40 by a gap D. Gap D may have a height of 0.05-0.3 mm or other heights, as examples.

Antenna 40 may convey radio-frequency signals 114 through antenna window 88. Antenna 40 may exhibit a radiation pattern that is tilted in the −X direction to optimize the quality of the wireless communications link with tablet computer 20 (FIG. 1) while stylus 10 is being used to interact with tablet computer 20. If care is not taken, radio-frequency antenna current flowing on arm 62 can induce corresponding radio-frequency current on metal hook 108 via near-field electromagnetic coupling across gap D. Current that flows along the loop of conductive material in metal hook 108 surrounding opening 110 (FIG. 8) can cause metal hook 108 to resonate (e.g., as a parasitic loop antenna in the X-Y plane). This resonance can distort the overall radiation pattern of antenna 40, thereby limiting the overall efficiency of antenna 40.

To mitigate these issues, metal hook 108 may be grounded to form part of the antenna ground 64 (FIG. 4) for antenna 40 while cap 18 is in the closed position. Metal hook 108 may, for example, be electrically coupled to metal tube 70 (which is held at a ground potential) through conductive wall 96, conductive adhesive 98, conductive bumper 100, metal sleeve 86, and welds 94. Conductive screw 90 may electrically couple metal tube 70 and thus metal hook 108 to ground traces 102 on printed circuit board 76. In this way, metal hook 108 may be held at the same ground reference potential as ground traces 102, conductive screw 90, metal tube 70, metal sleeve 86, conductive bumper 100, conductive adhesive 98, and conductive wall 96 (e.g., such that ground traces 102, conductive screw 90, metal tube 70, metal sleeve 86, conductive bumper 100, conductive adhesive 98, conductive wall 96 all form part of the antenna ground for antenna 40). This serves to prevent the loop of conductive material in metal hook 108 around opening 110 (FIG. 8) from forming a parasitic loop antenna that deteriorates the radio-frequency performance of antenna 40.

As shown in FIG. 9, a mechanical reinforcement structure such as plastic block 116 may be mounted to printed circuit board 76 over antenna 40. Conductive screw 90 may pass from metal tube 70 (on a first side of antenna 40) to a threaded screw boss 118 on printed circuit board 76 through plastic block 116. Conductive screw 90 may electrically couple metal tube 70 to ground traces 102 on printed circuit board 76. Conductive screw 92 may pass from metal tube 70 (on a second side of antenna 40) to a threaded screw boss 120 on printed circuit board 76 through plastic block 116. Conductive screw 92 may electrically couple metal tube 70 to floating contact pad 104 on printed circuit board 76.

In this way, conductive screw 90, conductive screw 92, and arm 62 of antenna 40 may be embedded within plastic block 116. Plastic block 116 may, for example, be formed from injection-molded plastic or other plastic structures. Plastic block 116, conductive screw 90, and conductive screw 92 may serve to reinforce the mechanical strength of shaft 16 on both sides of antenna 40 despite the removal of conductive material in metal tube 70 to form antenna window 88 (e.g., preventing snapping or bending of stylus 10 at antenna window 88).

As shown in FIG. 9, a non-conductive arresting member for metal hook 108 such as a dielectric bumper 112 may be inserted into the opening 110 (FIG. 8) of metal hook 108. Dielectric bumper 112 may be mounted to metal sleeve 86 or metal tube 70. Dielectric bumper 112 may be formed from a block, arm, or another structure that includes plastic, dielectric foam, rubber, ceramic, or other dielectric (insulating or non-conductive) materials. Metal hook 108 may laterally slide along dielectric bumper 112 when cap 18 is moved between the open and closed positions. Dielectric bumper 112 may sometimes also be referred to herein as dielectric (non-conductive) arresting member 112, dielectric block 112, or dielectric stopper 112.

Dielectric bumper 112 may serve to prevent metal hook 108 and thus dielectric wall 96 and dielectric cap housing 68' (FIGS. 7 and 8) from sliding or falling off shaft 16 when cap 18 is in the open position. For example, when cap 18 is moved from the closed position to the open position, metal hook 108 slides in the direction of arrow 122 around dielectric bumper 112. Dielectric bumper 112 catches (stops) end 124 of metal hook 108, holding metal hook 108 in place once cap 18 is in the open position, as shown in the cross-sectional side view of FIG. 10.

Figure 10:
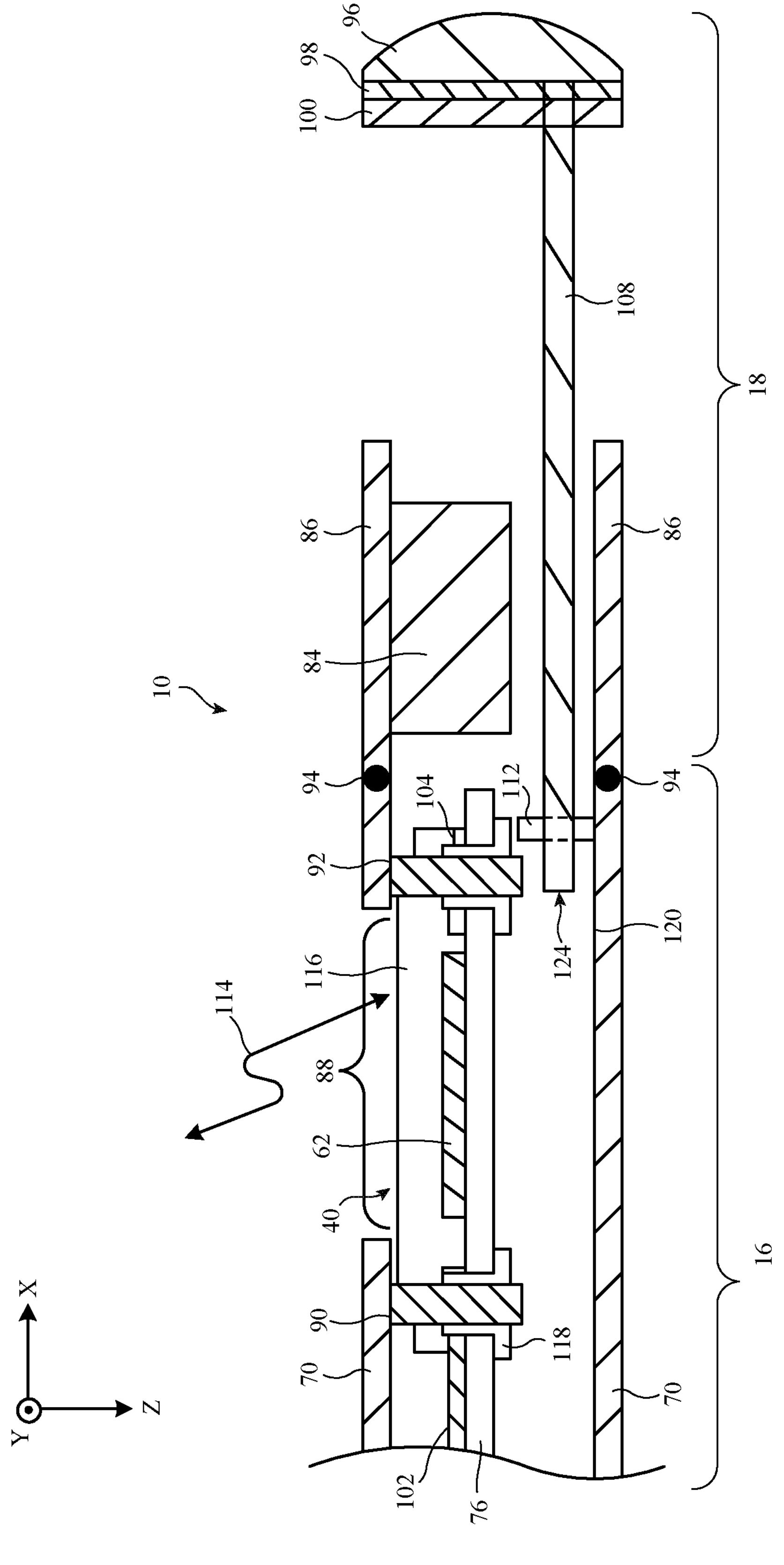
FIG. 10 is a cross-sectional side view of an illustrative stylus having an antenna next to a movable cap in an open position in accordance with some embodiments.

As shown in FIG. 10, when cap 18 is in the open position, end 124 of metal hook 108 is stopped from continuing to slide in the +X direction by dielectric bumper 112. Since dielectric bumper 112 is formed from dielectric material, metal hook 108 is not electrically coupled to metal sleeve 86 through dielectric bumper 112. In the open position, metal hook 108 and conductive wall 96 are no longer grounded because conductive bumper 100 no longer contacts metal sleeve 86 (e.g., conductive bumper 100 is longitudinally separated from metal sleeve 86). As such, metal hook 108 and conductive wall 96 no longer form part of the antenna ground for antenna 40. However, in the open position, metal hook 108 does not overlap antenna 40 (e.g., is non-overlapping with respect to arm 62). As such, arm 62 does not induce substantial current on metal hook 108 while antenna 40 conveys radio-frequency signals 114 and metal hook 108 does not deteriorate the performance of antenna 40, despite not being held at the ground potential of antenna 40.

Figure 11:
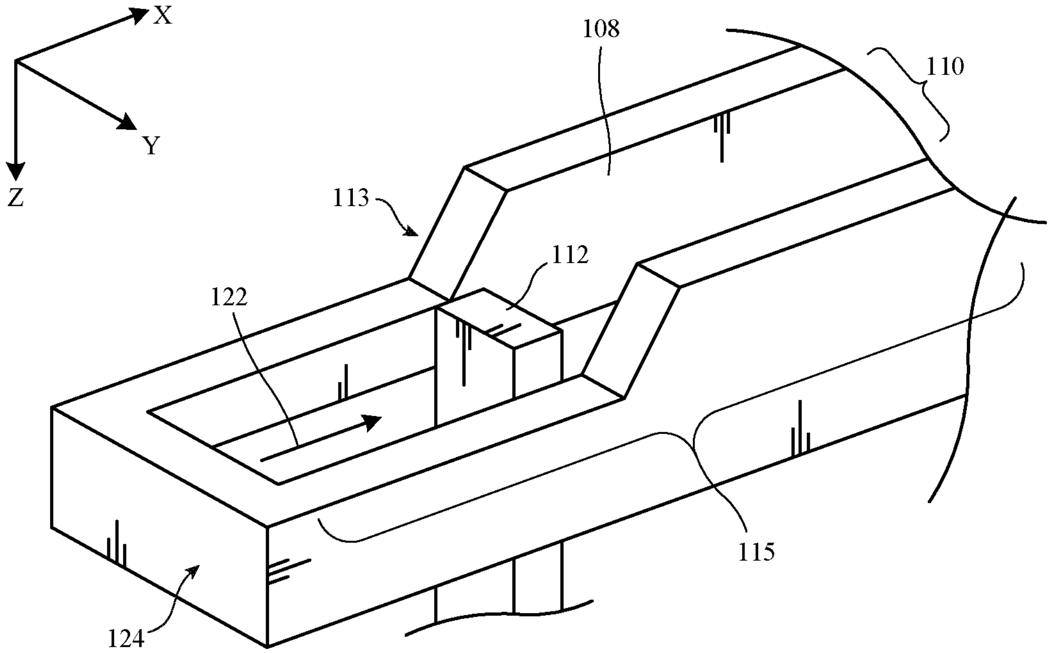
FIG. 11 is a perspective view of an illustrative metal hook in a movable cap of a stylus in accordance with some embodiments.

FIG. 11 is a perspective view of metal hook 108 and dielectric bumper 112. As shown in FIG. 11, metal hook 108 may include a loop of conductive material (e.g., walls) that laterally surrounds opening 110 (e.g., in the X-Y plane). Dielectric bumper 112 is inserted into opening 110. When metal hook 108 is moved to the open position (as shown by arrow 122), dielectric bumper 112 will contact end 124, preventing metal hook 108 from continuing to slide open. If desired, metal hook 108 may include a thinner portion (e.g., as measured along the Z-axis) at end 124 and a thicker portion closer to conductive wall 96 (FIG. 10). As such, metal hook 108 may include a ledge 113 between the thinner portion and the thicker portion. If desired, ledge 113 may contact or rest upon the lateral edge of printed circuit board 76 when cap 18 is in the closed position. The thicker portion may run along opposing sides of metal sleeve 86 (FIGS. 7-10) if desired (e.g., metal sleeve 86 may also be inserted into opening 110). Magnets (not shown) may be used to help propel metal hook 108 between the open and closed position and/or to help hold metal hook 108 in place in the closed and/or open positions.

In the example of FIG. 11, opening 110 is completely surrounded by the conductive material (loop) of metal hook 108. This is merely illustrative. If desired, the conductive material of metal hook 108 may laterally surround some but not all of opening 110. For example, wall 115 of metal hook 108 may be omitted, such that the opposing wall of metal hook 108 and end 124 form a bent L-shaped hook that catches dielectric bumper 112 in the open position. Metal hook 108 may have other shapes or structures if desired.

Figure 12:
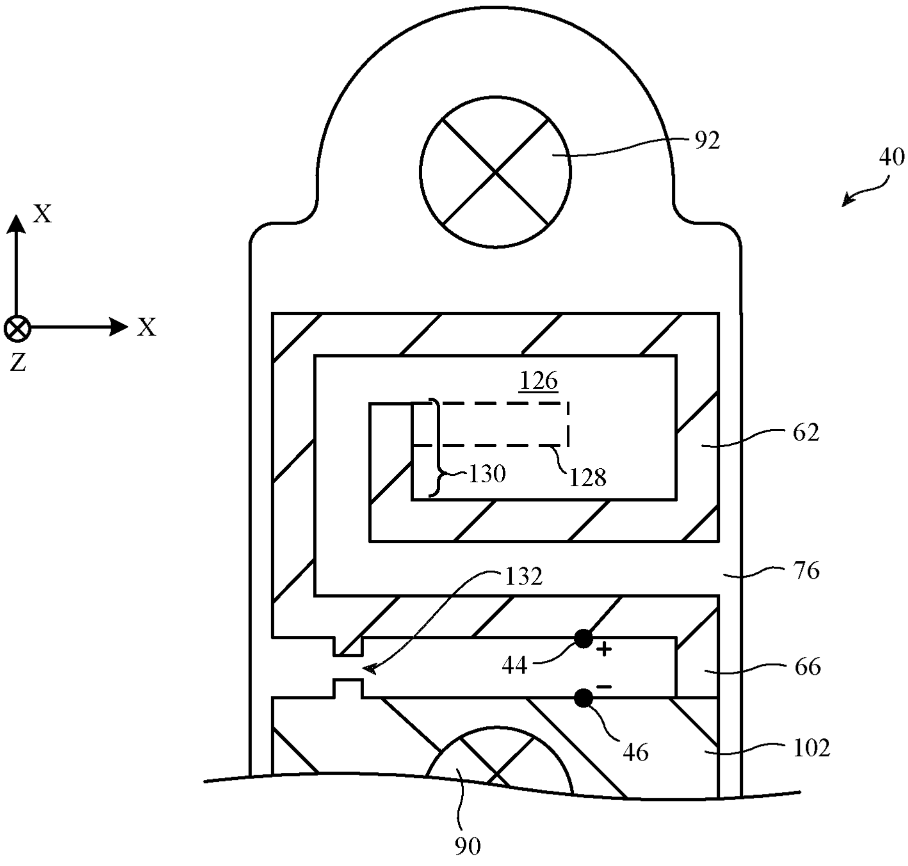
FIG. 12 is a top view of an illustrative antenna on a printed circuit board of a stylus in accordance with some embodiments.

FIG. 12 is a top view of antenna 40 on printed circuit board 76 (e.g., as viewed through antenna window 88 of FIGS. 7-10). As shown in FIG. 12, arm 62 of antenna 40 may be formed from conductive traces that follow a winding, coiling, or meandering path around a central opening 126 on the lateral surface of printed circuit board 76. This may allow arm 62 to exhibit a relatively long radiating length despite the small surface area of printed circuit board 76. In addition, this may configure arm 62 to include multiple anti-parallel segments from return path 66 to tip 130 (e.g., parallel to the Y-axis). Antenna current flowing along these anti-parallel segments may exhibit anti-parallel phases that cause the corresponding radio-frequency signals to at least partially cancel out in the +X direction, helping to tilt the radiation pattern of antenna 40 towards tip 14 of stylus 10 and thus tablet computer 20 during use (FIG. 1).

Arm 62 may be shorted to ground traces 102 by return path 66. If desired, one or more contact pads 132 may be coupled to arm 62 and/or ground traces 102. Contact pads 132 may form landing pads for surface-mount components that may be coupled to antenna 40 to tune the frequency response of antenna 40 (e.g., tunable components 48 of FIG. 3). Alternatively, contact pads 132 may form impedance matching stubs that help to perform impedance matching for antenna 40. The distance of antenna feed terminals 44 and 46 from return path 66 may also be selected to perform suitable impedance matching. Conductive screw 90 may be coupled to ground traces 102. Conductive screw 92 may be mounted to printed circuit board 76 on the opposing side of arm 62.

The example of FIG. 12 is merely illustrative. In general, arm 62 may wind any desired number of times around opening 126. For example, tip 130 may be omitted or arm 62 may include an additional segment 128 extending from tip 130. In general, arm 62 may include any desired number of straight and/or curved segments extending in any desired directions and may have any desired shape (e.g., having any desired number of straight and/or curved edges). The example of FIG. 12 in which antenna 40 is an inverted-F antenna is merely illustrative. Antenna 40 may have other types of antenna resonating elements formed from conductive traces on printed circuit board 76.

Figure 13:
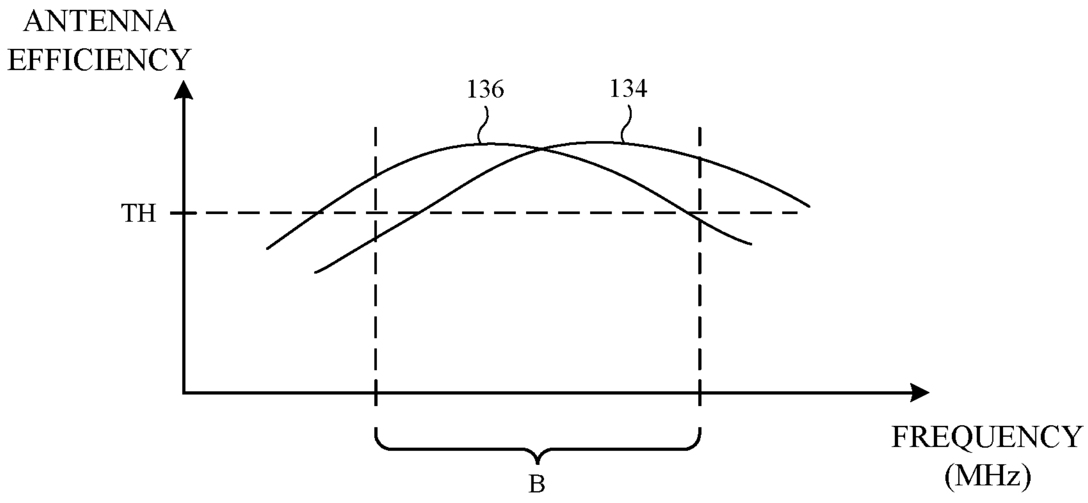
FIG. 13 is a plot of antenna performance (efficiency) as a function of frequency for a stylus antenna of the type shown in FIGS. 1-12 in accordance with some embodiments.

FIG. 13 is a plot of antenna performance (antenna efficiency) as a function of frequency for antenna 40. Curve 136 plots the antenna efficiency of antenna 40 when cap 18 and metal hook 108 are in the closed position. Curve 134 plots the antenna efficiency of antenna 40 when cap 18 and metal hook 108 are in the open position. As shown by curves 136 and 134, opening cap 18 may cause a slight shift in the response peak of antenna 40. However, grounding metal hook 108 when cap 18 is in the closed position (e.g., as shown in FIG. 9) may cause antenna 40 to exceed a minimum efficiency threshold TH associated with satisfactory radio-frequency performance for antenna 40 (e.g., −12-15 dB) across the frequency band B of operation of antenna 40 (e.g., a Bluetooth band between around 2400 MHz and 2500 MHz). In addition, the removal of metal hook 108 from the volume of antenna 40 when cap 18 is in the open position (e.g., as shown in FIG. 10) may also allow antenna 40 to exceed minimum efficiency threshold TH across frequency band B. As such, antenna 40 may exhibit satisfactory radio-frequency performance in frequency band B regardless of the position of cap 18.

As used herein, the term “concurrent” means at least partially overlapping in time. In other words, first and second events are referred to herein as being “concurrent” with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

Devices 10 and/or 20 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. A computer stylus comprising:
- a shaft;
- a cap coupled to the shaft by a metal hook;
- an antenna resonating element in the shaft and overlapping the metal hook; and
- a connector port, wherein
  - the cap is movable relative to the shaft between an open position and a closed position,
  - the antenna resonating element overlaps the metal hook when the cap is in the closed position,
  - the metal hook is coupled to a ground of the antenna resonating element while the cap is in the closed position, and
  - the metal hook is decoupled from the ground while the cap is in the open position.

2. The computer stylus of claim 1, wherein the cap is configured to slide, relative to the shaft, between the open position and the closed position, the connector port is covered by the cap while the cap is in the closed position, and connector contacts of the connector port are exposed while the cap is in the open position.

3. The computer stylus of claim 2, wherein the antenna resonating element is non-overlapping with respect to the metal hook when the cap is in the open position and wherein the metal hook is configured to prevent the cap from falling off the computer stylus while the cap is in the open position.

4. The computer stylus of claim 2, wherein the cap comprises:
- a conductive wall coupled to the metal hook, the metal hook extending from the conductive wall and into the shaft.

5. The computer stylus of claim 4, wherein the cap further comprises:
- a metal sleeve; and
- a conductive bumper that is disposed on the conductive wall, wherein the conductive bumper contacts the metal sleeve while the cap is in the closed position and the conductive bumper does not contact the metal sleeve while the cap is in the open position.

6. The computer stylus of claim 5, wherein the shaft comprises:
- a metal tube welded to the metal sleeve and having a window aligned with the antenna resonating element, wherein the metal sleeve remains in a fixed position while the cap moves between the closed position and the open position.

7. The computer stylus of claim 6, wherein the metal tube, the metal sleeve, and the conductive bumper form at least part of the ground while the cap is in both the closed position and the open position.

8. The computer stylus of claim 6, wherein the connector port is mounted to the metal sleeve and wherein the connector port protrudes through an aperture in the metal sleeve.

9. The computer stylus of claim 8, wherein the metal sleeve is interposed between the metal tube and the conductive wall of the cap.

10. The computer stylus of claim 8, wherein the shaft includes a dielectric tube surrounding the metal tube, the cap has a dielectric cap housing that lies flush with the dielectric tube while the cap is in the closed position, and the dielectric cap housing is separated from the dielectric tube while the cap is in the open position.

11. The computer stylus of claim 1, further comprising:
- a printed circuit board in the shaft, the antenna resonating element comprising conductive traces on the printed circuit board, wherein the shaft comprises:
  - a metal tube surrounding the printed circuit board, and
  - a window in the metal tube and aligned with the antenna resonating element;
- ground traces on the printed circuit board and coupled to the antenna resonating element;
- a first conductive screw that attaches the metal tube to the printed circuit board at a first side of the antenna resonating element and that electrically couples the metal tube to the ground traces;
- a second conductive screw that attaches the metal tube to the printed circuit board at a second side of the antenna resonating element opposite the first side of the antenna resonating element; and
- a plastic block on the printed circuit board, wherein the antenna resonating element, the first conductive screw, and the second conductive screw are embedded within the plastic block.

12. A computer stylus comprising:
- a shaft having a metal tube;
- a printed circuit board in the shaft and including ground traces;
- an antenna having an antenna resonating element on the printed circuit board and aligned with a window in the metal tube;
- a first conductive screw that couples the metal tube to the ground traces at a first side of the window;
- a second conductive screw that couples the metal tube to the ground traces at a second side of the window opposite the first side of the window;
- a cap configured to slide relative to the metal tube between an open position and a closed position; and
- a metal hook coupled to the cap and that extends from the cap into the metal tube, wherein
  - the metal hook is electrically coupled to the ground traces through the metal tube and the first and second conductive screws while the cap is in the closed position, and
  - the metal hook is electrically decoupled from the ground traces while the cap is in the open position.

13. The computer stylus of claim 12, further comprising:

a ground trace on the printed circuit board, wherein the first conductive screw electrically couples the metal tube to the ground trace, the antenna comprises an antenna ground that includes the ground trace, the first conductive screw, and the metal tube, and the antenna resonating element comprises an inverted-F antenna arm that follows a spiral path on the printed circuit board.

14. The computer stylus of claim 12, further comprising:

a plastic block on the printed circuit board and overlapping the antenna resonating element, wherein the first conductive screw and the second conductive screw extend through the plastic block.

15. The computer stylus of claim 12, wherein the window is interposed between the first and second conductive screws, the computer stylus further comprising:

a cap having a metal sleeve coupled to the metal tube at the second side of the window; and a connector port on the metal sleeve, wherein the stylus has a longitudinal axis and the connector port extends radially away from the longitudinal axis.

16. A computer stylus comprising:

a shaft having a dielectric bumper and a metal tube;

a cap having a metal loop with an opening, wherein the metal loop extends into the metal tube, the dielectric bumper is disposed within the opening of the metal loop, and the metal loop is configured to slide relative to the dielectric bumper between an open position and a closed position; and an antenna resonating element in the shaft and overlapping a window in the metal tube, wherein the antenna resonating element is different from the metal loop, the metal loop being interposed between the antenna resonating element and the metal tube while the cap is in the closed position, the metal loop is electrically coupled to the metal tube while the cap is in the closed position, and the metal loop is electrically decoupled from the metal tube while the cap is in the open position.

17. The computer stylus of claim 16, wherein the cap comprises:

a metal sleeve coupled to the metal tube;

a conductive wall coupled to the metal loop, the metal loop and the conductive wall being configured to slide relative to the metal sleeve and the dielectric bumper;

a connector port on the metal sleeve; and a compressive conductive bumper on the conductive wall, wherein the compressive conductive bumper contacts the metal sleeve in the at least one position of the metal loop relative to the dielectric bumper.

18. The computer stylus of claim 16, wherein:

the shaft has a longitudinal axis extending from a tip of the computer stylus to the cap, the cap has a first wall;

the metal loop comprises a second wall that extends from the first wall and parallel to the longitudinal axis, a third wall that extends from the first wall and parallel to the longitudinal axis, and a fourth wall that couples an end of the second wall to an end of the third wall, the fourth wall extends orthogonal to the longitudinal axis, the first wall, the second wall, the third wall, and the fourth wall laterally surround an opening, and the dielectric bumper is inserted into the opening.

19. The computer stylus of claim 1, wherein the antenna resonating element does not overlap the metal hook when the cap is in the open position.

20. The computer stylus of claim 1, wherein the cap comprises:

a conductive wall coupled to the metal hook, wherein the metal hook is coupled to the ground through the conductive wall while the cap is in the closed position, the metal hook comprises a loop of conductive material, and coupling the metal hook to the ground is configured to prevent the loop of conductive material from forming a parasitic antenna resonating element while the cap is in the closed position.

* * * * *